United States Patent
Lavallo et al.

(10) Patent No.: US 10,999,518 B1
(45) Date of Patent: May 4, 2021

(54) POP-UP CAMERA WITH AUTOMATIC POSITION CONTROL FOR AN INFORMATION HANDLING SYSTEM

(71) Applicant: Dell Products L.P., Round Rock, TX (US)

(72) Inventors: Jacob Hill Lavallo, Austin, TX (US); Shawn Paul Hoss, Georgetown, TX (US); Toh Kim Cheong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/858,047

(22) Filed: Apr. 24, 2020

(51) Int. Cl.
*H04N 5/232* (2006.01)
*H04N 5/225* (2006.01)

(52) U.S. Cl.
CPC ....... *H04N 5/23299* (2018.08); *H04N 5/2253* (2013.01)

(58) Field of Classification Search
CPC .......... H04N 5/23299; H04N 5/2253
USPC ......................................... 348/373
See application file for complete search history.

(56) References Cited

U.S. PATENT DOCUMENTS

| | | | |
|---|---|---|---|
| 6,812,958 B1 * | 11/2004 | Silvester | G06F 1/1607 348/207.1 |
| 7,286,181 B2 * | 10/2007 | Cha | G06F 1/1616 348/373 |
| 7,557,851 B2 * | 7/2009 | Ohashi | H04M 1/0214 348/333.06 |
| 7,570,485 B2 * | 8/2009 | Krah | G06F 1/1616 345/157 |
| 7,800,648 B2 * | 9/2010 | Lu | H04N 5/2252 348/207.1 |
| 8,430,594 B2 * | 4/2013 | Liu | H04N 5/2252 403/321 |
| 8,654,247 B2 * | 2/2014 | Chang | G03B 17/12 348/373 |
| D747,388 S * | 1/2016 | Seoc | D16/218 |
| 9,762,780 B2 * | 9/2017 | Jung | G06F 1/1605 |
| 10,284,697 B2 * | 5/2019 | Yin | H04M 1/0264 |
| 10,656,680 B2 * | 5/2020 | Fan | G06F 1/1647 |
| 10,659,697 B2 * | 5/2020 | Yang | H04N 5/23216 |
| 10,691,179 B2 * | 6/2020 | Douglas | G06F 1/1616 |
| 10,708,398 B2 * | 7/2020 | Yin | H04W 88/02 |
| 10,747,273 B1 * | 8/2020 | Wang | G06F 1/1686 |
| 10,866,620 B2 * | 12/2020 | Chen | G06F 1/1686 |
| 10,880,420 B2 * | 12/2020 | Yang | H04M 1/0249 |
| 10,887,436 B2 * | 1/2021 | Zeng | H04M 1/0237 |
| 2006/0261257 A1 * | 11/2006 | Hwang | H04M 1/0264 250/216 |
| 2007/0253703 A1 * | 11/2007 | Tsai | H04N 7/142 396/429 |

(Continued)

*Primary Examiner* — Pritham D Prabhakher
(74) *Attorney, Agent, or Firm* — Baker Botts L.L.P.

(57) ABSTRACT

An apparatus for an information handling system including: a chassis coupled to the information handling system and positioned within the information handling system, the chassis including: a top side and a bottom side, the bottom side positioned opposite the top side, the top side including an opening; and a camera module moveably coupled to the chassis, wherein the camera module is configured to linearly translate from the bottom side to the top side of the chassis and through the opening while concurrently automatically adjusting a camera viewing angle of the camera module.

19 Claims, 15 Drawing Sheets

(56) References Cited

U.S. PATENT DOCUMENTS

| | | | |
|---|---|---|---|
| 2015/0049237 A1* | 2/2015 | Ujiie | H04N 5/23206 348/333.13 |
| 2015/0189175 A1* | 7/2015 | Fan | H04N 5/2251 348/37 |
| 2017/0064166 A1* | 3/2017 | Xiong | H04M 1/0264 |
| 2017/0123463 A1* | 5/2017 | Douglas | G06F 1/1616 |
| 2017/0280033 A1* | 9/2017 | Yu | G03B 17/04 |
| 2018/0004256 A1* | 1/2018 | Douglas | G06F 1/1686 |
| 2018/0262663 A1* | 9/2018 | Zhang | H04M 1/0264 |
| 2018/0295328 A1* | 10/2018 | Tucker | H04N 5/23293 |
| 2019/0141170 A1* | 5/2019 | Zeng | H04M 1/0264 |
| 2019/0166236 A1* | 5/2019 | Zeng | H04N 5/2253 |
| 2019/0215389 A1* | 7/2019 | Yin | H04M 1/0264 |
| 2020/0177716 A1* | 6/2020 | Chen | H04M 1/0264 |
| 2020/0288003 A1* | 9/2020 | Zeng | H04M 1/0266 |

* cited by examiner

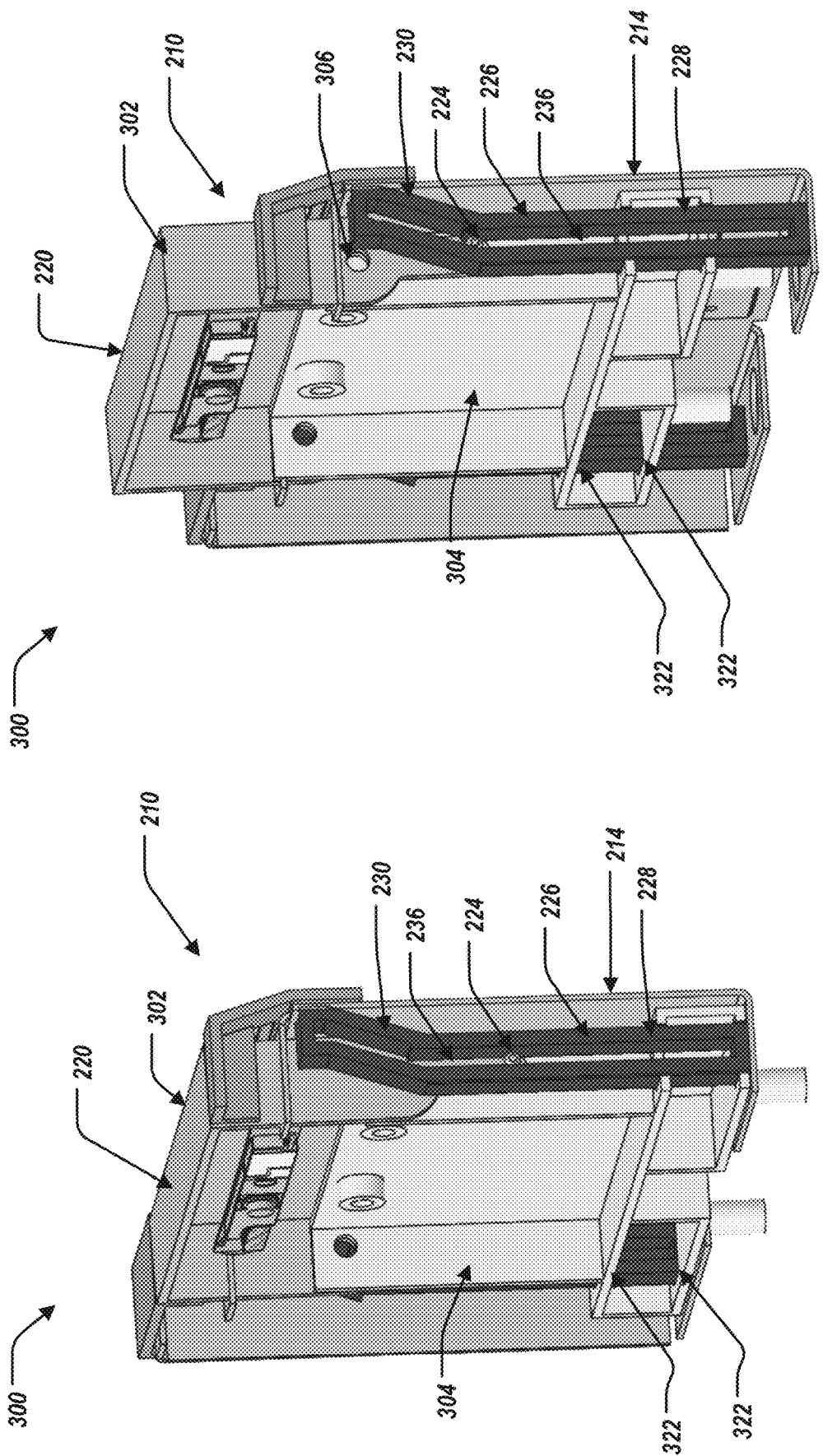

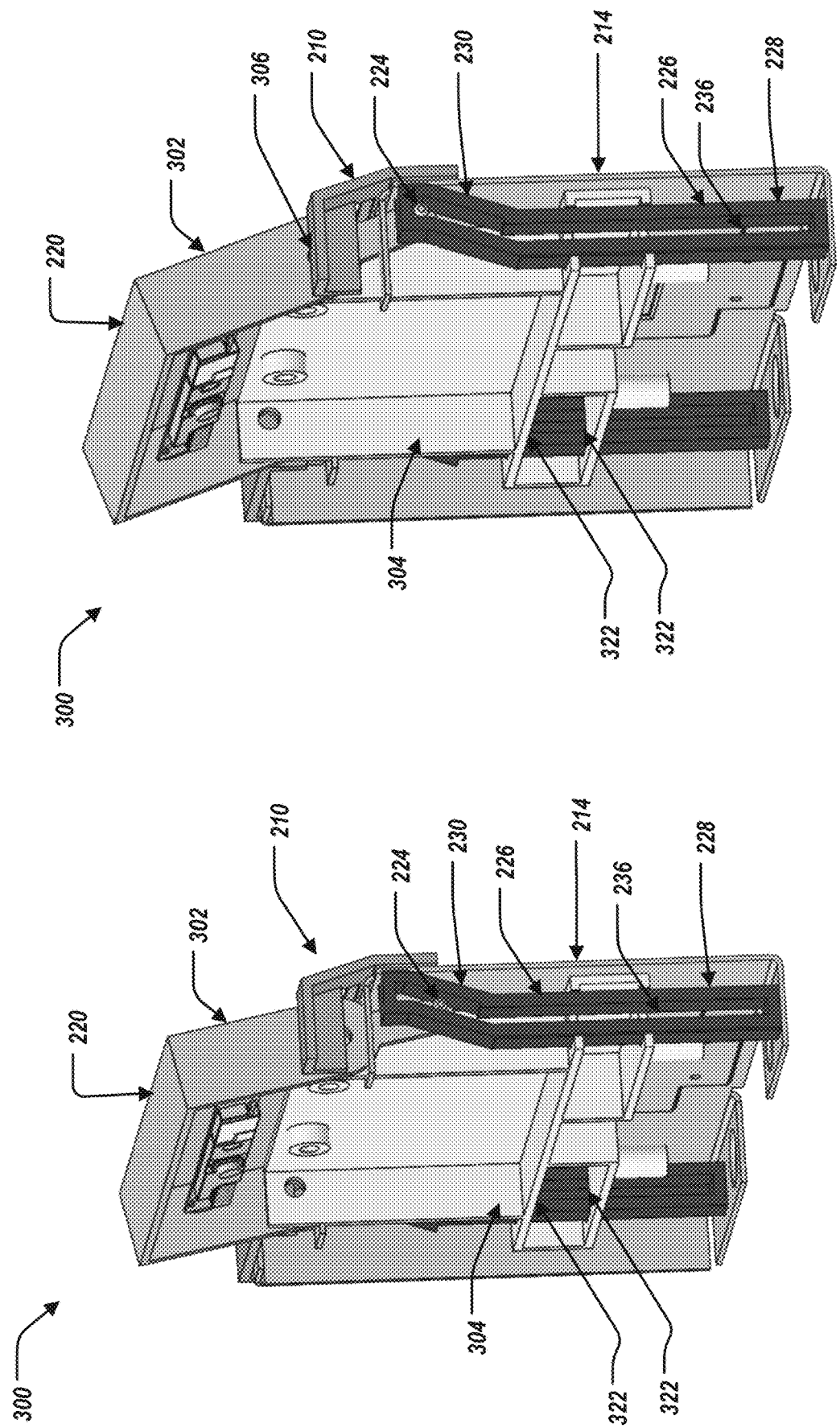

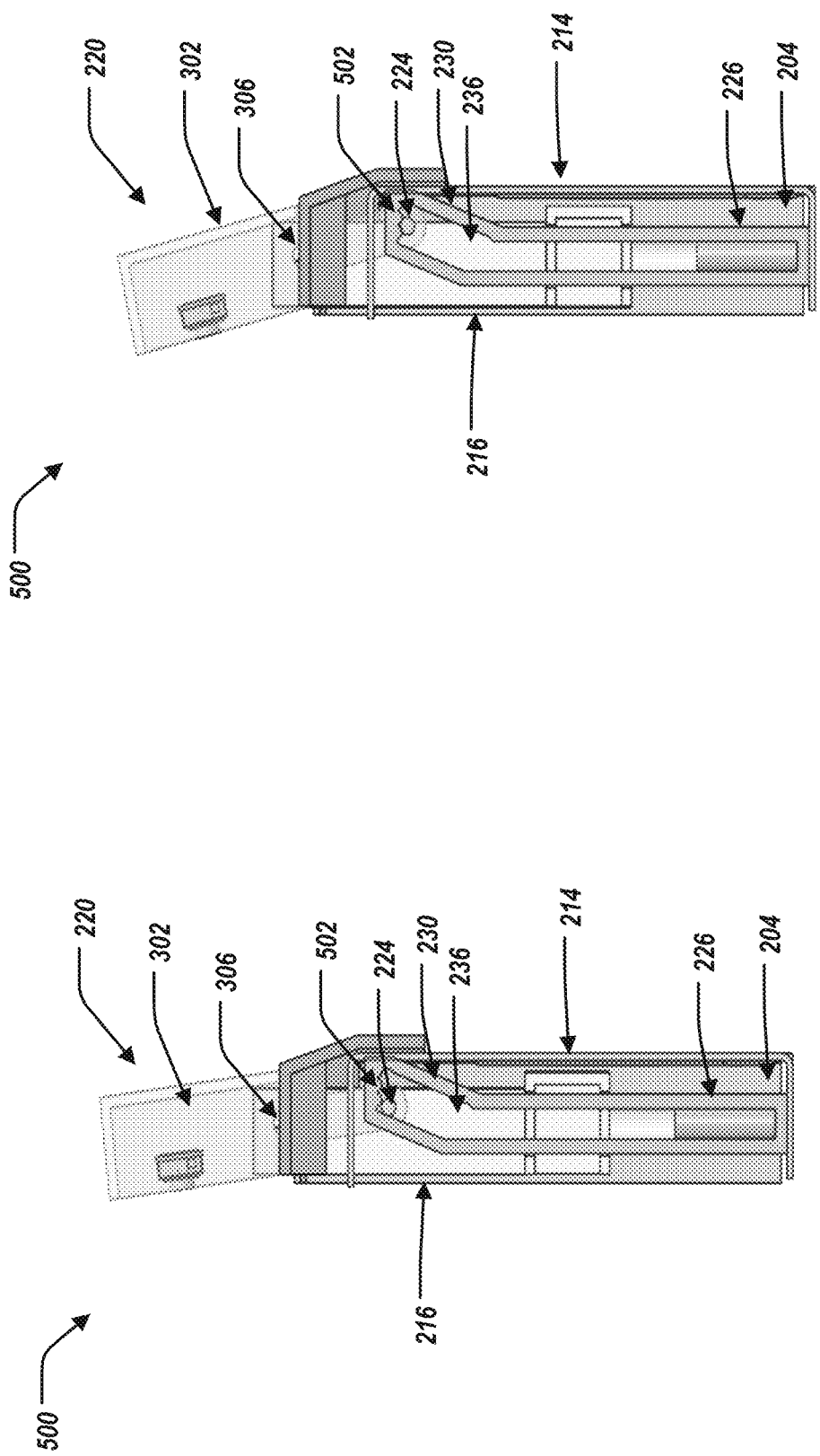

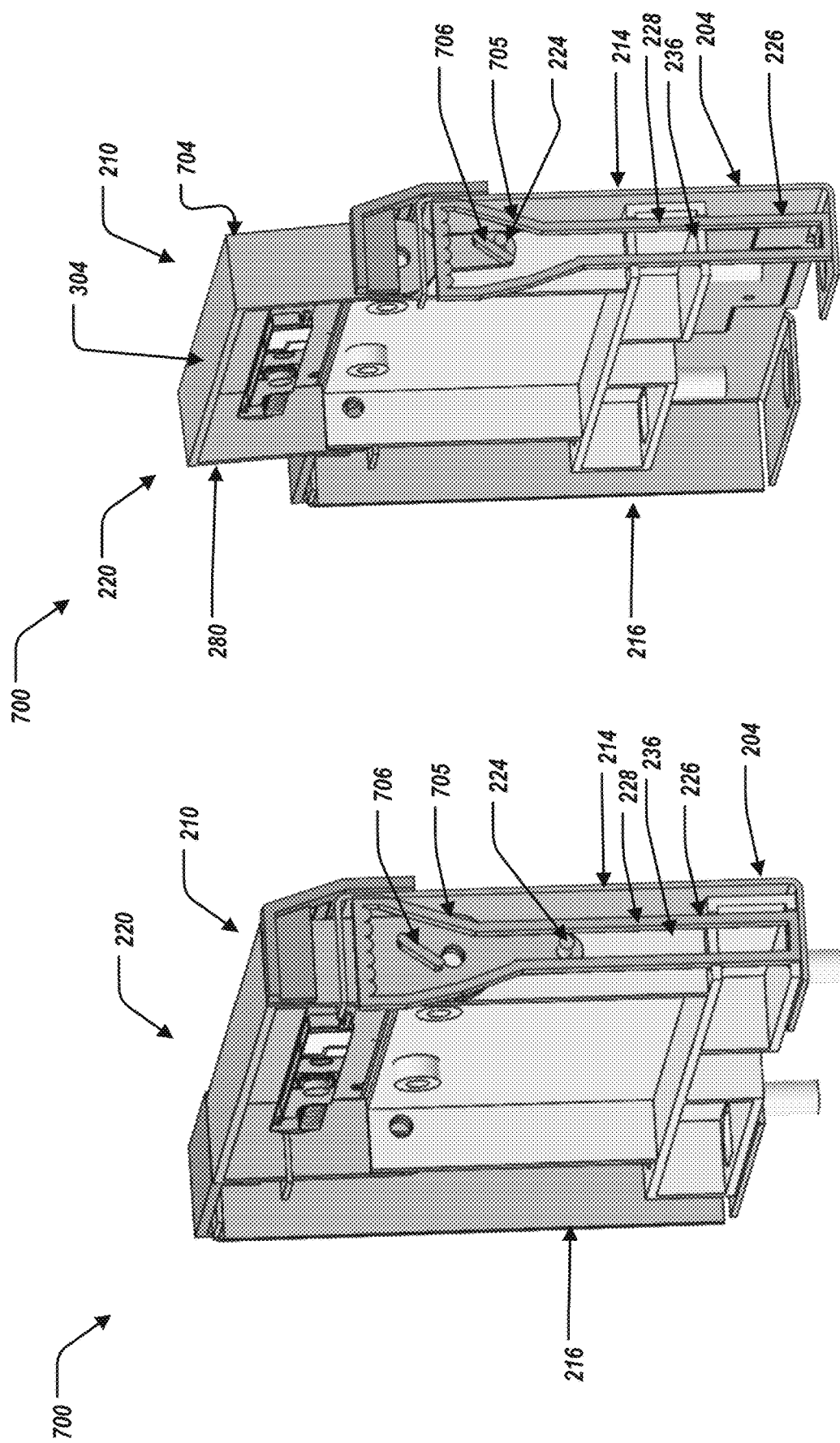

POP-UP CAMERA WITH AUTOMATIC POSITION CONTROL FOR AN INFORMATION HANDLING SYSTEM

BACKGROUND

Field of the Disclosure

The disclosure relates generally to an information handling system, and in particular, to a pop-up camera with automatic position control for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Display devices and all-in-one (AIO) computing systems are being driven towards narrow borders and a slim chassis depth with an emphasis on minimizing the top and side edges. At the same time front and world facing cameras (WFC) have become an important requirement but directly impact the top edge chassis depth. There is a need for a camera offering that maintains the benefits of the existing pop-up camera design but continues to reduce chassis depth and provide an improved user experience.

SUMMARY

Innovative aspects of the subject matter described in this specification may be embodied in an apparatus for an information handling system including a chassis coupled to the information handling system and positioned within the information handling system, the chassis including: a top side and a bottom side, the bottom side positioned opposite the top side, the top side including an opening; and a camera module moveably coupled to the chassis, wherein the camera module is configured to linearly translate from the bottom side to the top side of the chassis and through the opening while concurrently automatically adjusting a camera viewing angle of the camera module.

Other embodiments of these aspects include corresponding methods, apparatus, and computer programs, configured to perform the actions of the methods, encoded on computer storage devices.

These and other embodiments may each optionally include one or more of the following features. For instance, the chassis further includes a back side positioned between top and the bottom side, wherein the camera module includes a camera and an alignment feature, the apparatus further comprising: a guide structure fixedly coupled to the chassis, the guide structure including a straight portion and an angled portion, wherein the alignment feature is positioned within a recess of the guide structure, wherein when the alignment feature of the camera module is positioned within the recess of the straight portion of the guide structure, the camera module is substantially parallel with respect to the back side of the chassis, and when the alignment feature of the camera module is positioned within the recess of the angled portion of the guide structure, at least a portion of the camera module i) is positioned through the opening of the top side of the chassis and ii) is angled with respect to the back side of the chassis. The camera module includes a first portion and a second portion, wherein the first portion is configured to pivot about a connection point between the first portion and the second portion. Further including alignment pins fixedly coupled to the chassis and positioned between the top side and the bottom side of the chassis, and wherein the camera module further including openings such that the alignment pins are positioned through the openings of the camera module. The camera module further includes openings such that the guide structure is positioned through the openings of the camera module to provide racking alignment of the camera module. The angled portion of the guide structure includes detents, and wherein when the alignment feature of the camera module is positioned within the recess of the angled portion of the guide structure, the alignment feature abuts one or more of the detents to further define the angle of the camera module with respect to the back side of the chassis. Further including a frictional hinge coupled to the chassis, wherein when the alignment feature of the camera module is positioned within the recess of the angled portion of the guide structure, the frictional hinge is configured to define the angle of the camera module with respect to the back side of the chassis. The camera module further includes an additional camera positioned opposite to the camera. The angled portion of the guide structure is positioned proximate to the top side of the chassis and the straight portion of the guide structure is positioned proximate to the bottom side of the chassis. The camera module is angled towards a front side of the chassis, the front side of the chassis opposite to the back side of the chassis and between the top side and the bottom side of the chassis. The camera module is angled towards the back side of the chassis.

Innovative aspects of the subject matter described in this specification may be embodied in an information handling system, comprising a display unit; a camera apparatus coupled to the display unit, the apparatus including: a chassis coupled to the information handling system and positioned within the information handling system, the chassis including: a top side and a bottom side, the bottom side positioned opposite the top side, the top side including an opening, and a back side positioned between the top and the bottom side; a camera module moveably coupled to the chassis, the camera module including a camera and an alignment feature; a guide structure fixedly coupled to the chassis, the guide structure including a straight portion and an angled portion, wherein the alignment feature is positioned within a recess of the guide structure, wherein when the alignment feature of the camera module is positioned within the recess of the straight portion of the guide structure, the camera module is substantially parallel with respect to the back side of the chassis, and when the alignment feature of the camera module is positioned within the recess of the angled portion of the guide structure, at least a portion of the camera module i) is positioned through the opening of the top side of the chassis and ii) is angled with respect to the back side of the chassis.

Other embodiments of these aspects include corresponding methods, apparatus, and computer programs, configured to perform the actions of the methods, encoded on computer storage devices.

These and other embodiments may each optionally include one or more of the following features. For instance, the camera module includes a first portion and a second portion, wherein the first portion is configured to pivot about a connection point between the first portion and the second portion. Further including alignment pins fixedly coupled to the chassis and positioned between the top side and the bottom side of the chassis, and wherein the camera module further including openings such that the alignment pins are positioned through the openings of the camera module. The camera module further includes openings such that the guide structure is positioned through the openings of the camera module to provide racking alignment of the camera module. The angled portion of the guide structure includes detents, and wherein when the alignment feature of the camera module is positioned within the recess of the angled portion of the guide structure, the alignment feature abuts one or more of the detents to further define the angle of the camera module with respect to the back side of the chassis. Further including a frictional hinge coupled to the chassis, wherein when the alignment feature of the camera module is positioned within the recess of the angled portion of the guide structure, the frictional hinge is configured to define the angle of the camera module with respect to the back side of the chassis. The camera module further includes an additional camera positioned opposite to the camera. The angled portion of the guide structure is positioned proximate to the top side of the chassis and the straight portion of the guide structure is positioned proximate to the bottom side of the chassis.

Innovative aspects of the subject matter described in this specification may be embodied in an apparatus for an information handling system including: a chassis coupled to the information handling system and positioned within the information handling system, the chassis including: a top side and a bottom side, the bottom side positioned opposite the top side, the top side including an opening, and a back side positioned between the top and the bottom side; a camera module moveably coupled to the chassis, the camera module including a top portion configured to pivot about a connection point between the top portion and the bottom portion, the camera module including: a camera, and an alignment feature; a guide structure fixedly coupled to the chassis, the guide structure including a straight portion and an angled portion, wherein the alignment feature is positioned within a recess of the guide structure, wherein when the alignment feature of the camera module is positioned within the recess of the straight portion of the guide structure, the camera module is substantially parallel with respect to the back side of the chassis, and when the alignment feature of the camera module is positioned within the recess of the angled portion of the guide structure, at least a portion of the camera module i) is positioned through the opening of the top side of the chassis and ii) is angled with respect to the back side of the chassis, wherein the camera module further includes openings such that the guide structures are positioned through the openings of the camera module.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 3A-3D illustrate the camera apparatus, in a second embodiment.

FIGS. 5A-5C illustrate rotation of the camera apparatus using detents.

FIGS. 7A-7D illustrate the camera apparatus, in a fourth embodiment.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-8 wherein like numbers are used to indicate like and corresponding parts.

Figure 1:
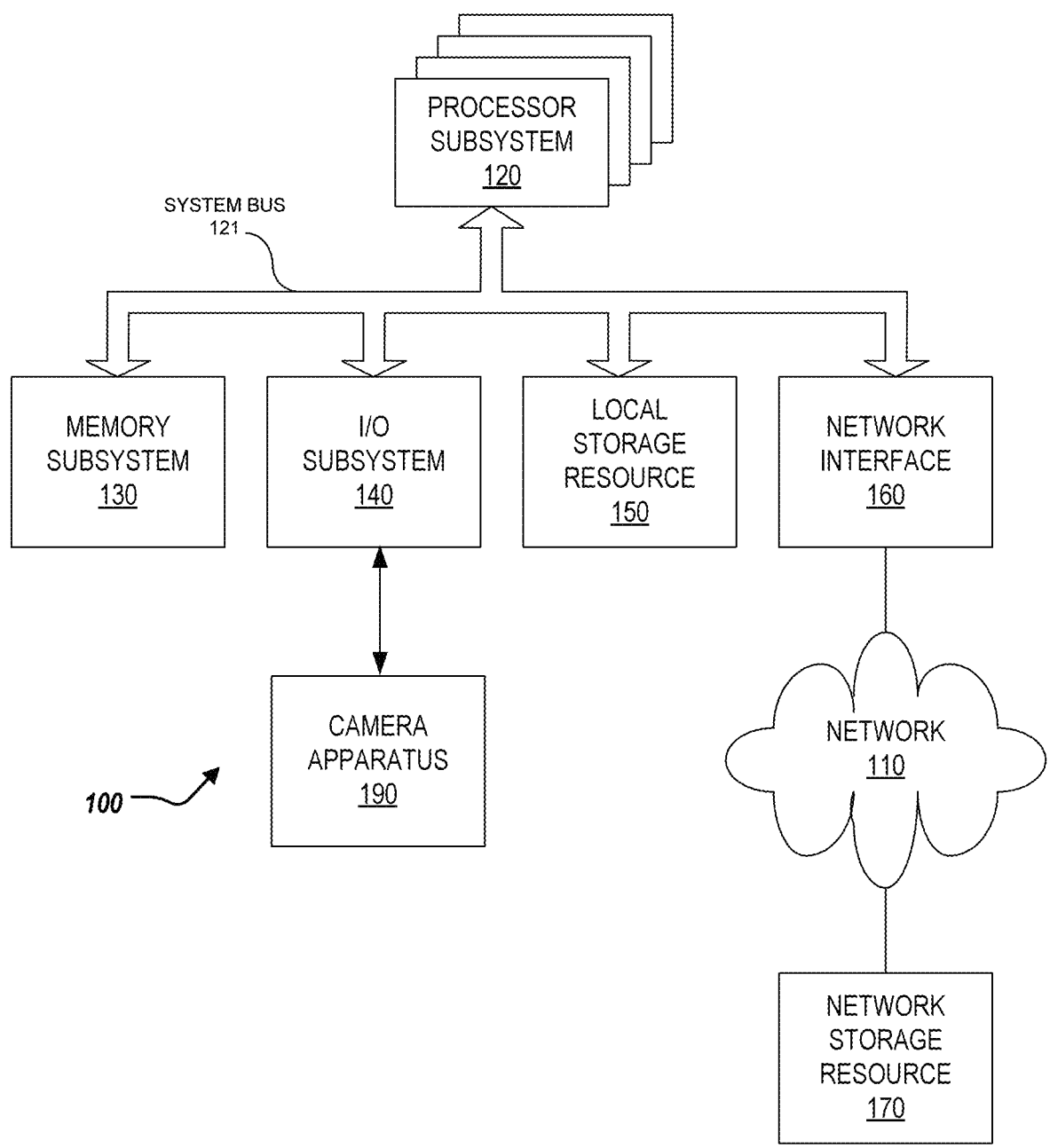
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include a camera apparatus 190. The camera apparatus 190 can be in communication with the I/O subsystem 140 or included by the I/O subsystem 140.

Figure 2A:
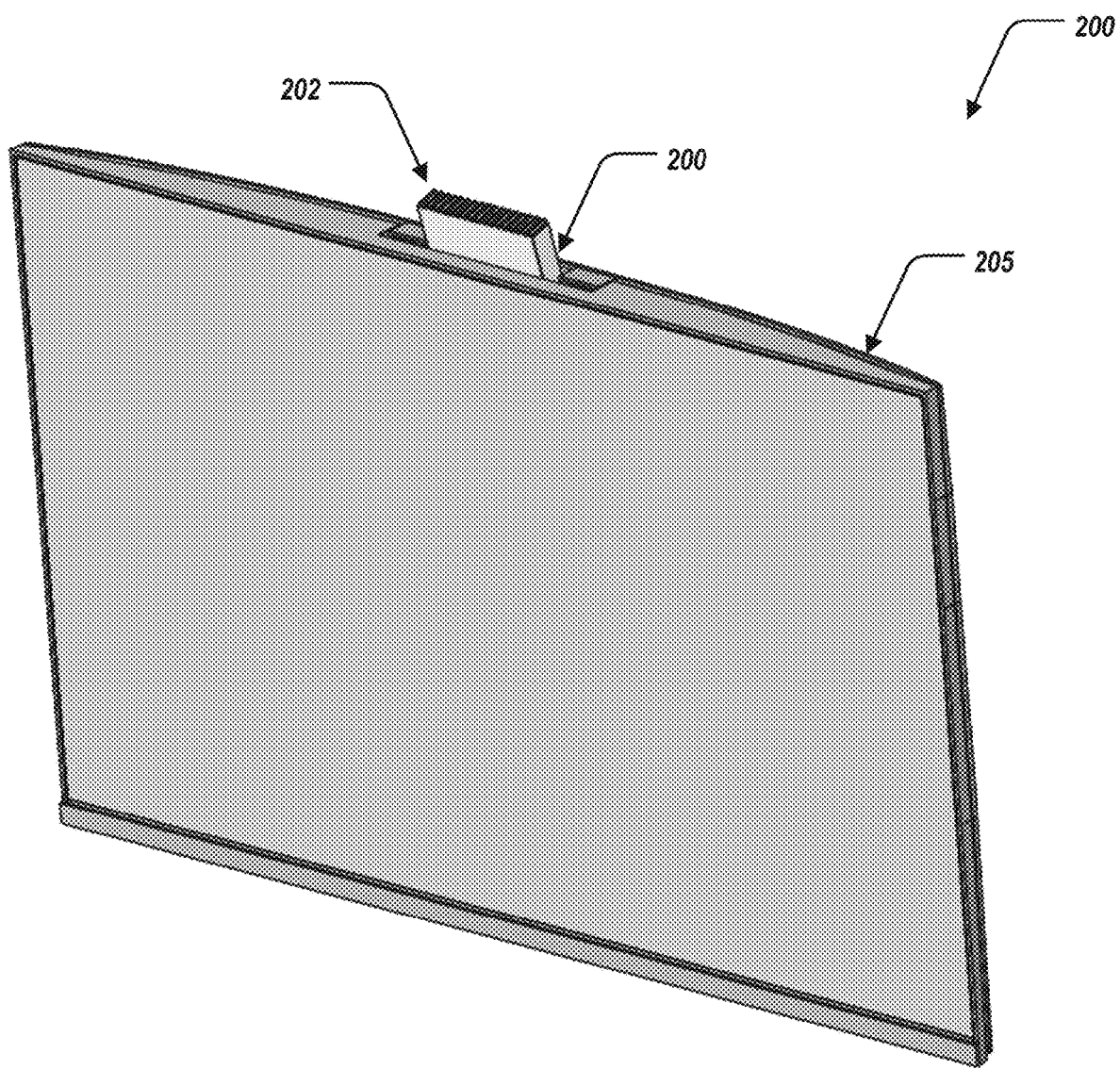
FIGS. 2A-2D illustrate the camera apparatus, in a first embodiment.

Turning now to FIG. 2A, FIG. 2A illustrates a computing environment 200 including a camera apparatus 202. The camera apparatus 202 can be similar to the camera apparatus 190 of FIG. 1. In short, the camera apparatus 202 can facilitate providing a mechanical method for automatic control of a camera viewing angle, while further providing manual user adjustability of the camera.

Figure 2B:
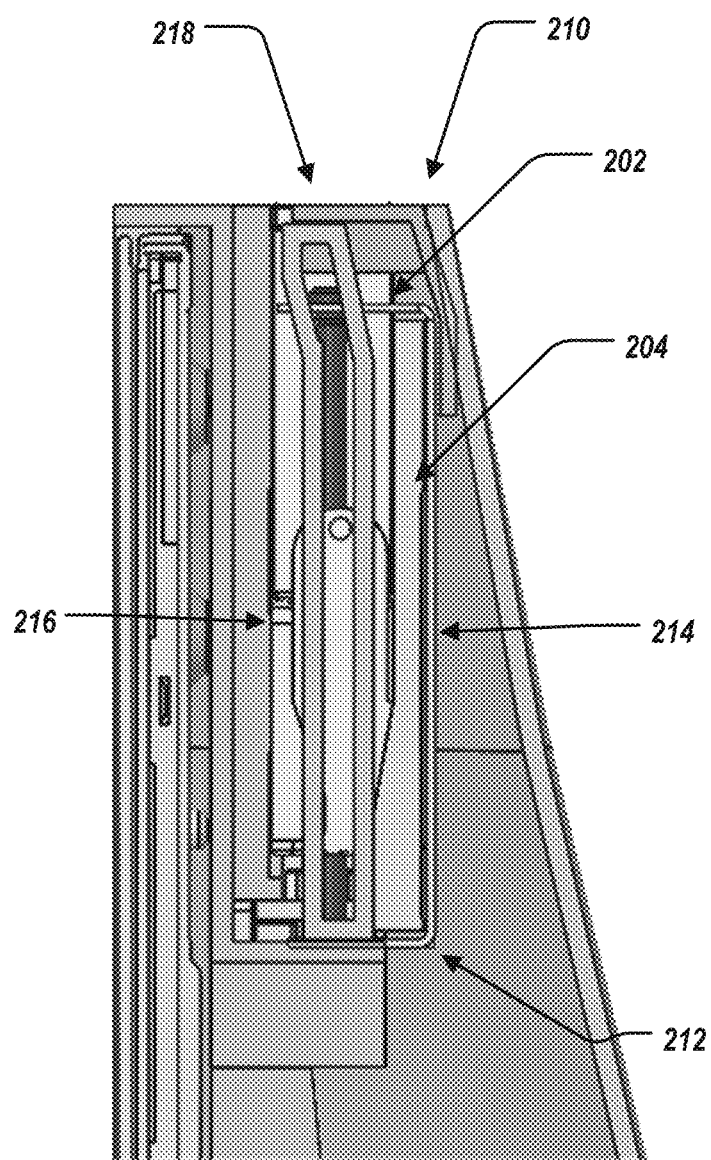

The apparatus 202 can be coupled to an information handling system 206 and positioned within the information handling system 206. As shown in FIG. 2B, the apparatus 202 can include a chassis 204 that includes a top side 210 and a bottom side 212. The bottom side 212 is positioned opposite to the top side 210. The chassis 204 can further include a back side 214 and a front side 216. The back side 214 is positioned opposite to the front side 216. Additionally, the back side 214 and the front side 216 are positioned between the top side 210 and the bottom side 212. The top side 210 can include an opening 218.

Figure 2C:
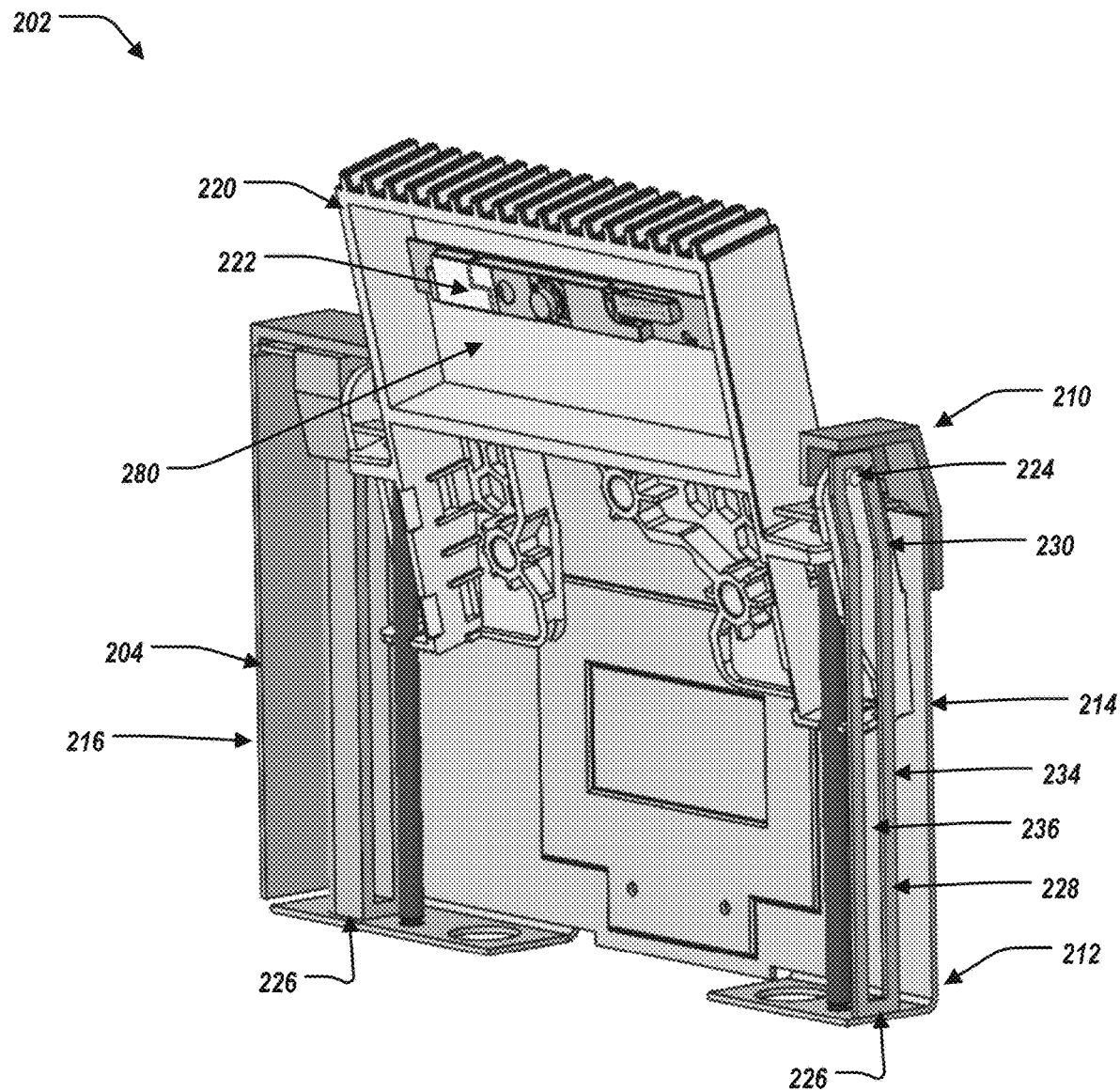

FIG. 2C illustrates a cut-away view of the apparatus 202, and specifically, the apparatus 202 including a camera module 220. The camera module 220 is moveably coupled to the chassis 204. The camera module 220 can include a camera 222 and an alignment feature 224, or alignment post 224. The camera 222 can be positioned on a first side 280 of the camera module 220.

The apparatus 202 can further include guide structures 226, or guide rails 226, fixedly attached to the chassis 204. The guide rail 226 can include a straight portion 228 and an angled portion 230. The angled portion 230 of the guide rail 226 can be positioned proximate to the top side 210 of the chassis 204. The straight portion 228 can be positioned proximate to the bottom side 212 of the chassis 204.

Figure 2D:
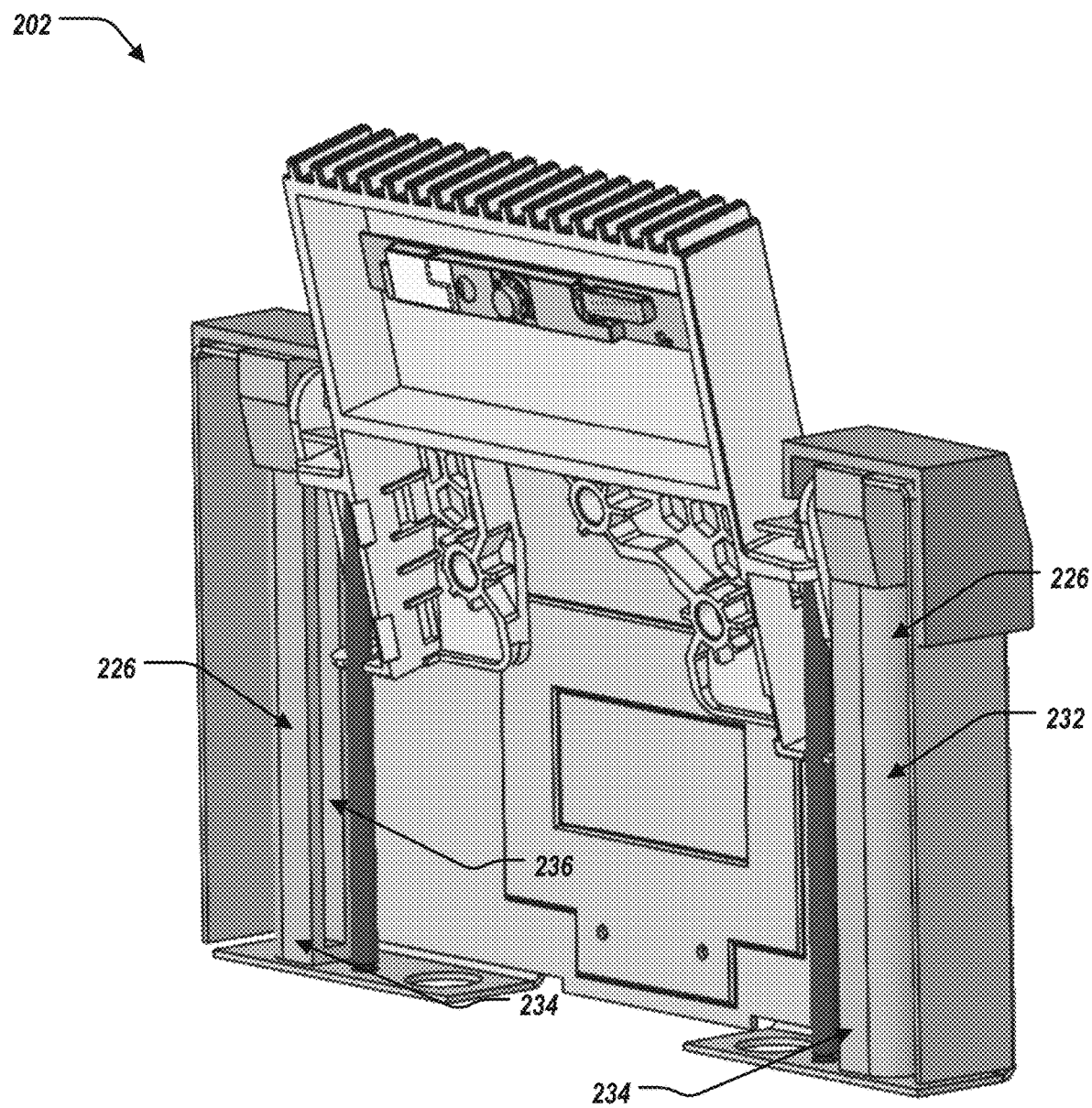

FIG. 2D illustrates the apparatus 202, and specifically, a full view of the guide rail 226. The guide rail 226 can include a first surface 232 with protrusions 234 extending therefrom. Defined between the protrusions 234 is a recess 236 extending along a length of the guide rail 226.

In short, the guide rail 226 can facilitate control of the position of the camera module 220 within the chassis 204, as described further herein. Further, the guide rail 226 can provide an initial angle to the camera module 220 as the camera module 220 egresses from the opening 218 and is protected from damage as the camera module 220 ingresses through the opening 218, described further herein.

Specifically, the alignment post 224 of the camera module 220 can be positioned within the recess 236 of the guide rail 226. Movement of the alignment post 224 of the camera module 220 (e.g., as initiated by a user of the computing environment 200), can be defined by the recess 236—that is, the movement of the alignment post 224, and thus, the camera module 220, is provided by the guide rail 226 and specifically, the recess 236.

As shown in FIG. 2B, the camera module 220 is in a first positional state. Specifically, when the alignment post 224 of the camera module 220 is positioned within the recess 236 of the straight portion 228 of the guide rail 226, the camera module 220 is in the first positional state. Furthermore, when the alignment post 224 of the camera module 220 is positioned within the recess 236 of the straight portion 228 of the guide rail 226, the camera module 220 is substantially parallel (e.g., a plane of the camera module 220 is substantially parallel) with respect to the back side 214 of the chassis 204. That is, the camera module 220 is positioned within the chassis 204, and further, within the apparatus 202.

As shown in FIG. 2C, the camera module 220 is in a second positional state. Specifically, when the alignment post 224 of the camera module 220 is positioned within the recess 236 of the angled portion 230 of the guide rail 226, the camera module 220 is in the second positional state. Furthermore, when the alignment post 224 of the camera module 220 is positioned within the recess 236 of the angled portion 230 of the guide rail 226, the camera module 220 is in the second positional state, at least a portion of the camera module 220 is i) positioned through the opening 218 of the top side 210 of the chassis 204 and ii) angled with respect to the back side 214 of the chassis 204 (e.g., a plane of the portion of the camera module 220 is angled with respect to the back side 214 of the chassis 204). For example, the camera module 220 is angled towards the front side 216 of the chassis 204. In some examples, the camera module 220 is angled towards the front side 216 of the chassis 204 at an initial viewing angle. In some examples, the initial viewing angle is adjustable (e.g., in response to user input of the user of the computing environment 200).

The camera module 220 can be transitioned from the first positional state to the second positional state—e.g., the user physically altering the positional state of the camera module 220. Specifically, the camera module 220 can be held in the first positional state such that the camera module 220 is temporarily coupled to the chassis 204—e.g., by clips or another holding mechanism. The apparatus can further include one or more springs (not shown) that are coupled between the camera module 220 and the chassis 204. The springs can exert a force on the camera module 220 to translate the camera module 220 from the first positional state to the second positional state. The camera module 220 can be held temporarily in place in the first positional state to overcome such force applied by the camera module 220—e.g., by the clips or the another holding mechanism. When the holding mechanism is disengaged, the springs can apply the force to the camera module 220 to facilitate translating the camera module 220 to the top side 210 of the chassis 204, and through the opening 218 of the top side 210 of the chassis 204—e.g., to the second positional state. The springs can facilitate translating the camera module 220 to the top side 210 of the chassis 204 as defined by the guide rail 226, and specifically, as defined by movement of the alignment post 224 of the camera module 220 within the recess 236 of the guide rail 226 from the straight portion 228 of the guide rail 226 to the angled portion 230 of the guide rail 226 such that the camera module 220 transitions from the first positional state to the second positional state.

In some examples, the camera module 220 can transition from the first positional state to the second positional state based on detection of a user proximate to the information handling system 206. For example, the information handling system 206 further include a proximity sensor for detection of the user when proximate to the information handling system 206.

Furthermore, the camera module 220 can be transitioned from the second positional state to the first positional state—e.g., by the user physically altering the positional state of the camera module 220. Specifically, a force can be applied to the camera module 220 to overcome the force exerted by the springs to translate the camera module 220 towards the bottom side 212 of the chassis 204 such that the camera module 220 is positioned within the chassis 204. The guide rail 226 can define the translation of the camera module 220 to the bottom side 212 of the chassis 204 to minimize/prevent damage to the camera module 220 as the alignment post 224 of the camera module 220 within the recess 236 of the guide rail 226 transitions from the angled portion 230 (and thus, the camera module 220 being angled with respect to the back side 214 of the chassis 204) to the straight portion 228 of the guide rail 226. As the camera module 220 transitions from the second positional state to the first positional state, the camera module 220 can engage the clips or the another holding mechanism such that the clips or the another holding mechanism holds the camera module 220 temporarily in place in the first positional state.

FIG. 3A illustrates a further example of the camera apparatus, shown as apparatus 300 (similar to the apparatus 202). Specifically, the camera module 220 of the apparatus 300 can include a first portion 302 and a second portion 304. The first portion 302 can be coupled to the second portion 304 about a pivot point 306 (shown in FIGS. 3B, 3D). The first portion 302 is rotatably/pivotable about the pivot point 306 with respect to the second portion 304. As shown in FIG. 3A, the camera module 220 is in the first positional state. Referring to FIG. 3B, the camera module 220 is shown translating from the first positional state to the second positional state. Specifically, the camera module 220 can translate towards the top side 210 of the chassis 204 (e.g., by a force applied by springs) defined by the guide rail 226, and specifically, as defined by movement of the alignment post 224 of the camera module 220 within the recess 236 of the guide rail 226 from the straight portion 228 of the guide rail 226 to the angled portion 230 of the guide rail 226.

FIG. 3C illustrates further translation of the camera module 220 to the second positional state, and specifically, rotation of the first portion 302 with respect to the second portion 304 of the camera module 220 about the pivot point 306. That is, as the camera module 220 translates towards the top side 210 of the chassis 204 (e.g., by a force applied by springs) defined by the guide rail 226, and specifically, as the alignment post 224 of the camera module 220 is within the recess 236 of the angled portion 230 of the guide rail 226, the first portion 302 of the camera module 220 becomes angled with respect to the back side 214 of the chassis 204 (e.g., a plane of the portion of the camera module 220 is angled with respect to the back side 214 of the chassis 204. Additionally, as the camera module 220 translates towards the top side 210 of the chassis 204 defined by the guide rail 226, and specifically, as the alignment post 224 of the camera module 220 is within the recess 236 of the angled portion 230 of the guide rail 226, the second portion 304 of the camera module 220 is substantially parallel (e.g., a plane of the camera module 220 is substantially parallel) with respect to the back side 214 of the chassis 204.

FIG. 3D illustrates the camera module 220 is in the second positional state. Specifically, when the camera module 220 is in the second positional state, the first portion 302 continues rotation with respect to the second portion 304 of the camera module 220 about the pivot point 306 to establish the second positional state.

Referring to FIGS. 3A-3D, the camera module 220 can include openings 322 such that the guide rails 226 can be positioned through the openings 322 of the camera module 220. The guide rails 226 positioned through the openings 322 of the camera module 220 can minimize, if not prevent, racking of the camera module 220 as the camera module 220 changes from the first positional state to the second positional state (and from the second positional state to the first positional state). That is, the guide rails 226 positioned through the openings 322 of the camera module 220 can facilitate providing vertical alignment of the camera module 220 as the camera module 220 changes from the first positional state to the second positional state (and from the second positional state to the first positional state).

Figure 4:
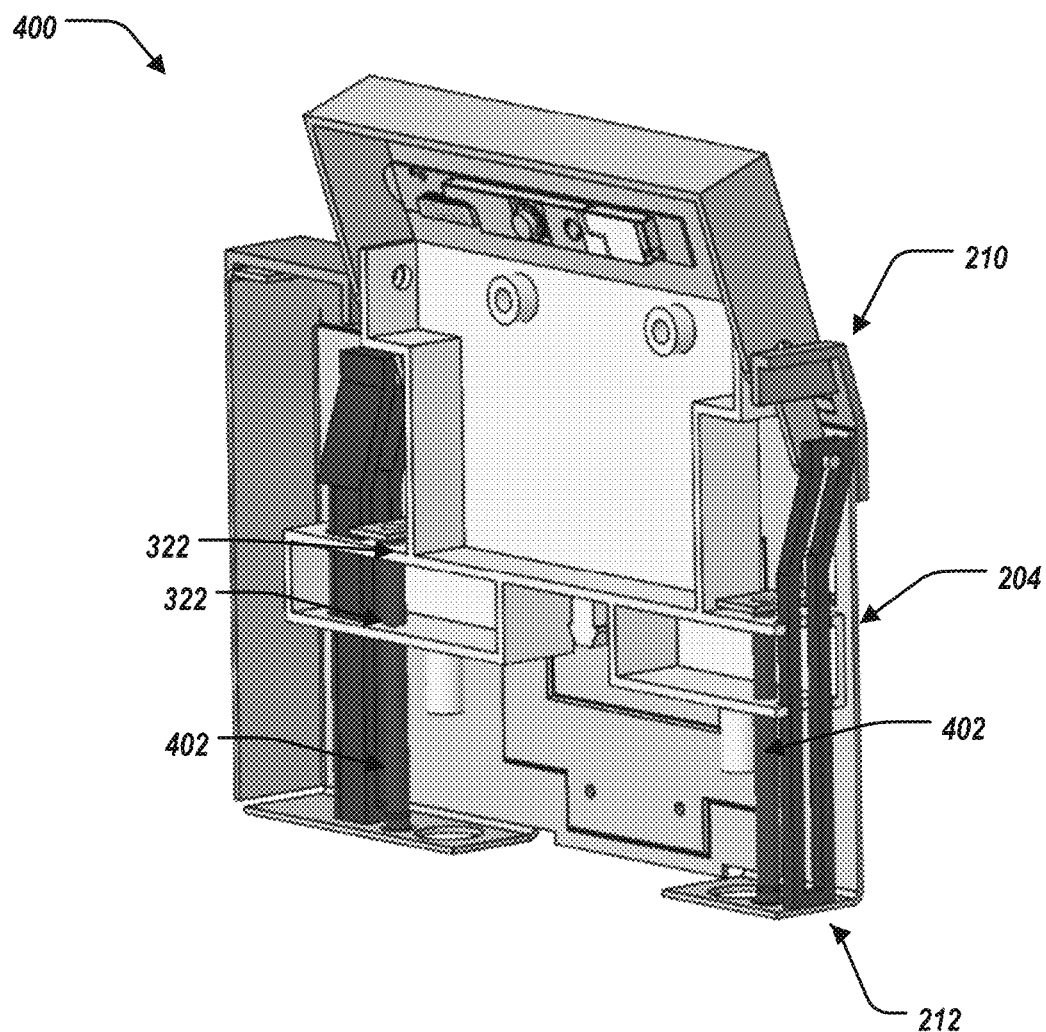
FIG. 4 illustrates the camera apparatus, in a third embodiment.

FIG. 4 illustrates a further example of the camera apparatus, shown as apparatus 400 (similar to the apparatus 202). In some examples, the apparatus 400 can further include alignment pins 402. The alignment pins 402 can be fixedly attached to the chassis 204 and positioned between the top side 210 and the bottom side 212 of the chassis 204. The camera module 220 can include openings 322 such that the alignment pins 320 can be positioned through the openings 322 of the camera module 220.

The alignment pins 402 can minimize, if not prevent, racking of the camera module 220 as the camera module 220 changes from the first positional state to the second positional state (and from the second positional state to the first positional state). That is, the alignment pins 402 can facilitate providing vertical alignment of the camera module 220 as the camera module 220 changes from the first positional state to the second positional state (and from the second positional state to the first positional state).

Figure 5C:
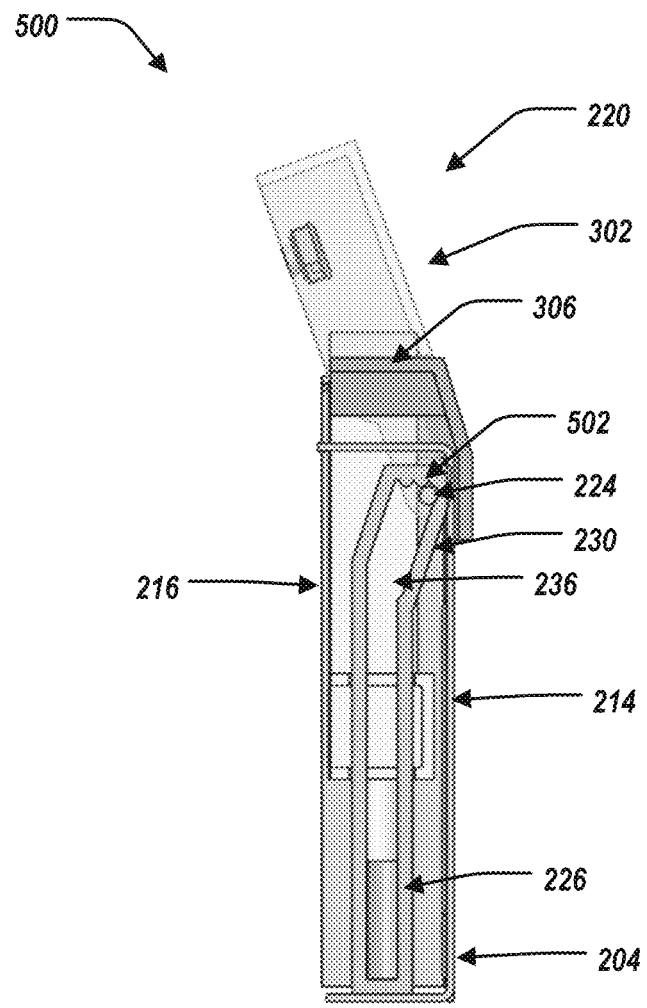

FIGS. 5A-5C illustrate a further example of the camera apparatus, shown as apparatus 500 (similar to the apparatus 202). In some examples, the angled portion 230 of the guide rail 226 can include detents 502. The detents 502 can further define the angle of the camera module 220 with respect to the back side 214 of the chassis 204. Specifically, when the alignment post 224 of the camera module 220 is within the recess 236 of the angled portion 230 of the guide rail 226 (e.g., when the camera module 220 is in the second positional state), the alignment post 224 abuts one or more of the detents 502 to define the angle of the camera module 220 with respect to the back side 214 of the chassis 204. The angled portion 230 of the guide rail 226 can include any number of detents depending on the application desired.

FIG. 5A illustrates the camera module 220 in the second positional state, and in particular, the first portion 302 of the camera module 220 in a first angled state with respect to the back side 214 of the chassis 204. Specifically, the alignment post 224 abuts the detent 502 that is proximate to the front side 216 of the chassis 204. As a result, the first portion 302 of the camera module 220 (e.g., a plane of the first portion 302 of the camera module 220) has the first angled state with respect to the back side 214 of the chassis 204—i.e., an initial angle of the camera module 220 with respect to the back side 214 of the chassis 204.

FIG. 5B illustrates the camera module 220 in the second positional state, and in particular, the first portion 302 of the camera module 220 in a second angled state with respect to the back side 214 of the chassis 204. Specifically, the alignment post 224 abuts the detent 502 that is in-between the back side 214 and the front side 216 of the chassis 204. As a result, the first portion 302 of the camera module 220 (e.g., a plane of the first portion 302 of the camera module 220) has the second angled state with respect to the back side 214 of the chassis 204. The user of the computing environment 200 can adjust the angle of the first portion 302 of the camera module 220 by applying a force to the first portion 302 of the camera module 220—e.g., rotating the first portion 302 of the camera module 220 about the pivot point 306.

FIG. 5C illustrates the camera module 220 in the second positional state, and in particular, the first portion 302 of the camera module 220 in a third angled state with respect to the back side 214 of the chassis 204. Specifically, the alignment post 224 abuts the detent 502 that is proximate to the back side 214 of the chassis 204. As a result, the first portion 302 of the camera module 220 (e.g., a plane of the first portion 302 of the camera module 220) has the third angled state with respect to the back side 214 of the chassis 204. The user of the computing environment 200 can adjust the angle of the first portion 302 of the camera module 220 by applying a force to the first portion 302 of the camera module 220—e.g., rotating the first portion 302 of the camera module 220 about the pivot point 306.

Figure 6B:
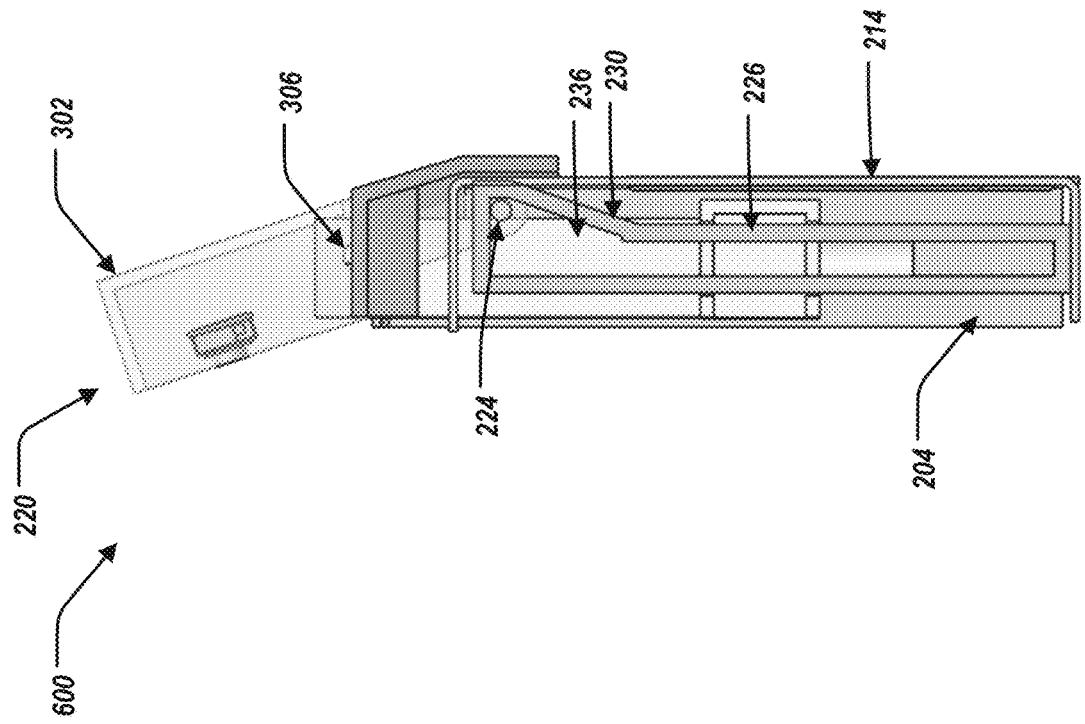
FIGS. 6A-6B illustrate rotation of the camera apparatus using frictional hinges.
Figure 6A:
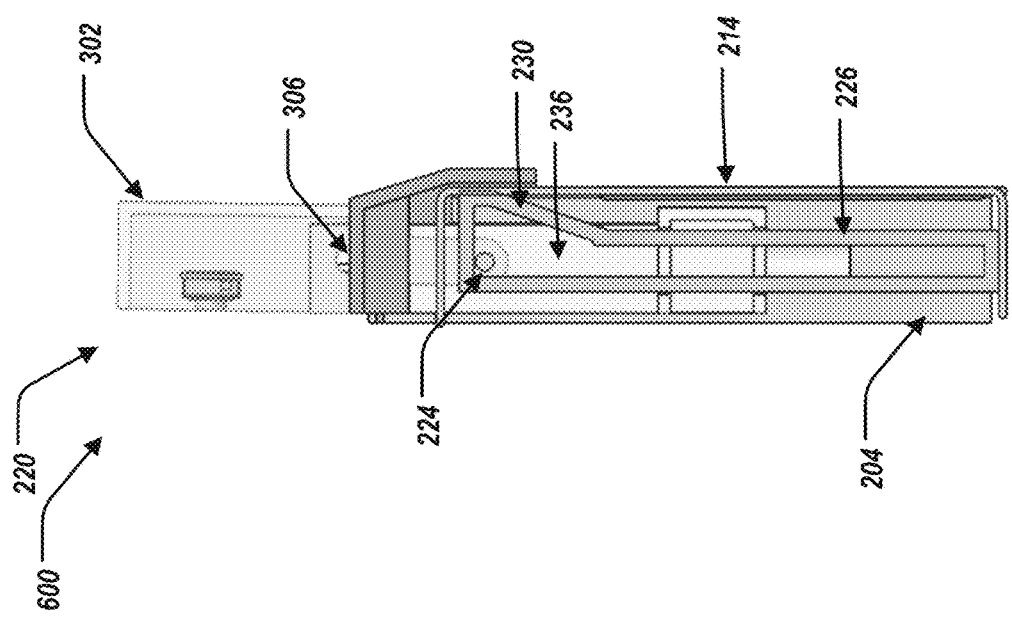

FIGS. 6A-6B illustrate a further example of the camera apparatus, shown as apparatus 600 (similar to the apparatus 202). In some examples, the chassis 204 and/or the first portion 302 of the camera module 220 can include frictional hinges. The frictional hinges can define the angle of the camera module 220 with respect to the back side 214 of the chassis 204. Specifically, when the alignment post 224 of the camera module 220 is within the recess 236 of the angled portion 230 of the guide rail 226 (e.g., when the camera module 220 is in the second positional state), the frictional hinges can further define the angle of the camera module 220 with respect to the back side 214 of the chassis 204.

FIG. 6A illustrates the camera module 220 in the second positional state, and in particular, the first portion 302 of the camera module 220 in a first angled state with respect to the back side 214 of the chassis 204. Specifically, the frictional hinges apply a first frictional force to the first portion 302 of the camera module 220 such that the first portion 302 of the camera module 220 (e.g., a plane of the first portion 302 of the camera module 220) has the first angled state with respect to the back side 214 of the chassis 204—i.e., an initial angle of the camera module 220 with respect to the back side 214 of the chassis 204.

FIG. 6B illustrates the camera module 220 in the second positional state, and in particular, the first portion 302 of the camera module 220 in a second angled state with respect to the back side 214 of the chassis 204. Specifically, the frictional hinges apply a second frictional force to the first portion 302 of the camera module 220 such that the first portion 302 of the camera module 220 (e.g., a plane of the first portion 302 of the camera module 220) has the second angled state with respect to the back side 214 of the chassis 204. The user of the computing environment 200 can adjust the angle of the first portion 302 of the camera module 220 by applying a force to the first portion 302 of the camera module 220—e.g., rotating the first portion 302 of the camera module 220 about the pivot point 306 to change the frictional force applied by the frictional hinges to the first portion 302 of the camera module 220.

FIGS. 7A-7D illustrate a further example of the camera apparatus, shown as apparatus 700 (similar to the apparatus 202). The camera module 220 can include an additional camera (not shown). The additional camera can be positioned on a second side 704 of the camera module 220. The second side 704 opposite to the first side 280 of the camera module 220. The guide rail 226 can include an expanded angled portion 705. The expanded angle portion 705 can further include a partial partition 706. To that end, the expanded angled portion 705 provides adjusting the angle of the camera module 220 with respect to the chassis 204, and specifically, providing that the camera module 220 can be angled with respect to the back side 214 of the chassis 204 (e.g., a plane of the portion of the camera module 220 is angled with respect to the back side 214 of the chassis 204), as well as providing that the camera module 220 can be angled with respect to the front side 216 of the chassis 204 (e.g., a plane of the portion of the camera module 220 is angled with respect to the front side 216 of the chassis 204).

FIG. 7A illustrates the camera module 220 of the apparatus 700 in the first positional state. Specifically, when the alignment post 224 of the camera module 220 is positioned within the recess 236 of the straight portion 228 of the guide rail 226, the camera module 220 is in the first positional state. Furthermore, when the alignment post 224 of the camera module 220 is positioned within the recess 236 of the straight portion 228 of the guide rail 226, the camera module 220 is substantially parallel (e.g., a plane of the camera module 220 is substantially parallel) with respect to the back side 214 of the chassis 204. That is, the camera module 220 is positioned within the chassis 204, and further, within the apparatus 202.

Referring to FIG. 7B, the camera module 220 is shown translating from the first positional state to the second positional state. Specifically, the camera module 220 can translate towards the top side 210 of the chassis 204 (e.g., by a force applied by springs) defined by the guide rail 226, and specifically, as defined by movement of the alignment post 224 of the camera module 220 within the recess 236 of the guide rail 226 from the straight portion 228 of the guide rail 226 to the angled portion 230 of the guide rail 226.

In some examples, upon translation of the camera module 220 from the first positional state to the second positional state, the alignment post 224 of the camera module 220 can come into contact with the partial partition 706. The partial partition 706 can direct translation of the alignment post 224 of the camera module 220 towards the back side 214 of the chassis 204 when the camera module 220 is transitioned from the first positional state to the second positional state. That is, the partial partition 706 can be pitched towards the back side 214 of the chassis 204 to direct the alignment post 224 towards the back side 214 of the chassis 204, described further with respect to FIG. 7C.

Figure 7D:
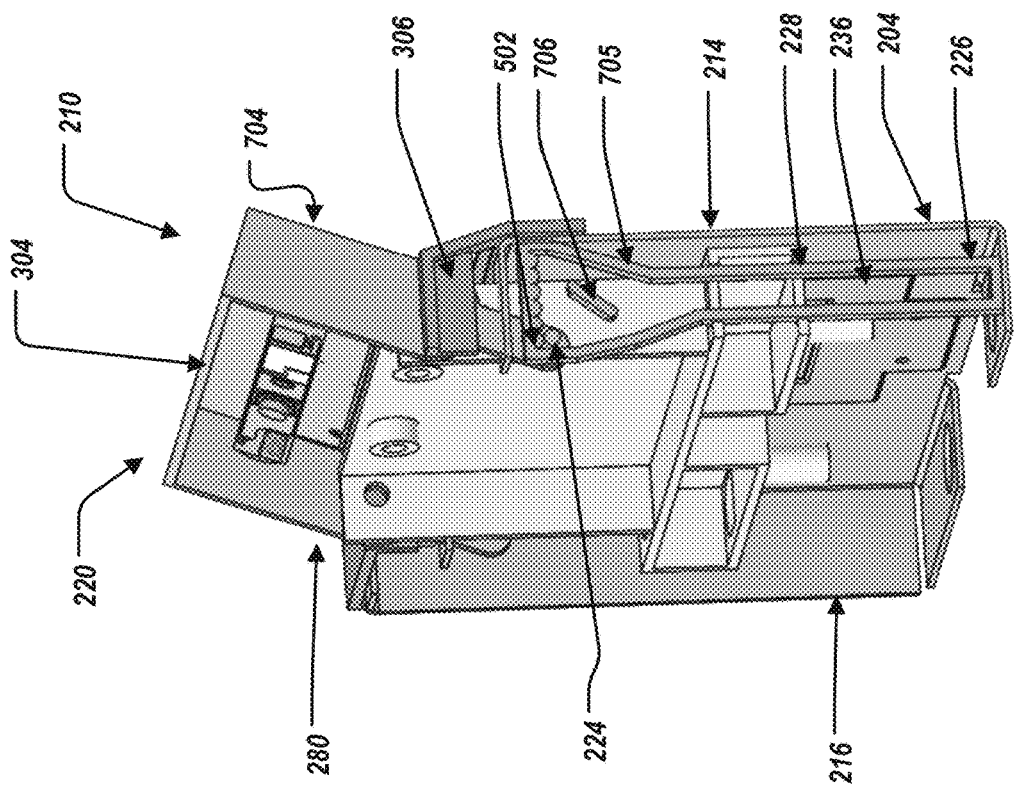
Figure 7C:
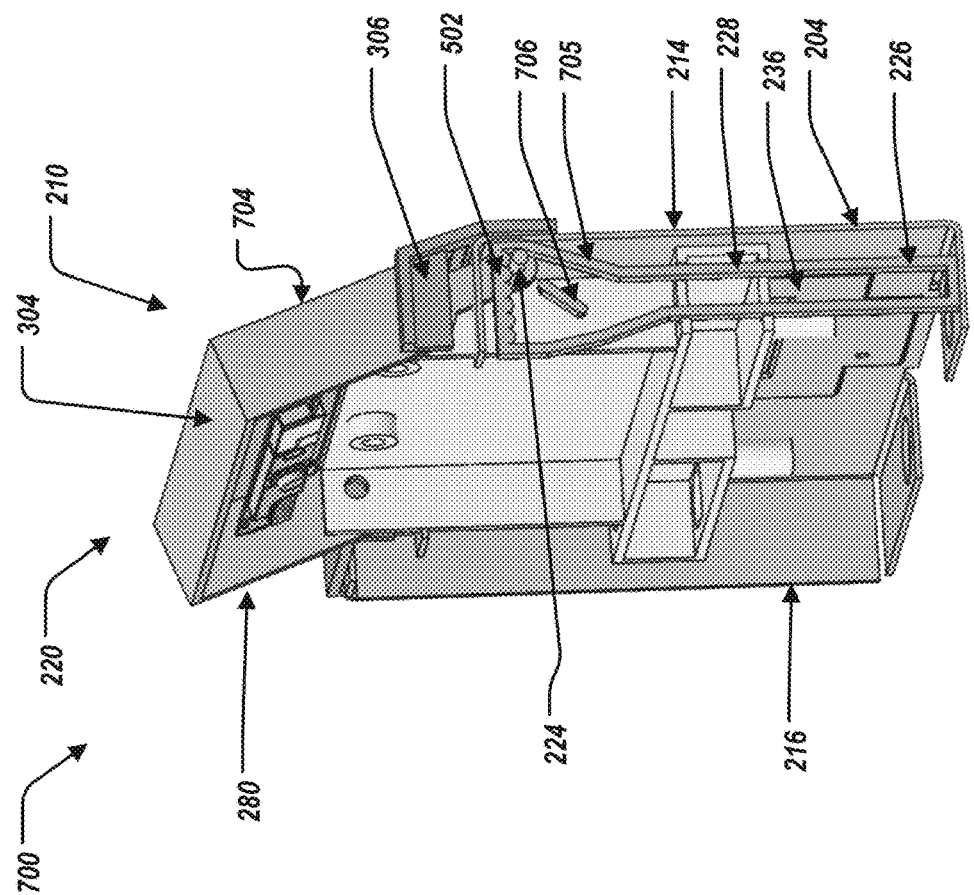

FIG. 7C illustrates further translation of the camera module 220 to the second positional state, and specifically, rotation of the first portion 302 with respect to the second portion 304 of the camera module 220 about the pivot point 306. That is, as the camera module 220 translates towards the top side 210 of the chassis 204 (e.g., by a force applied by springs), the partial partition 706 directs translation of the alignment post 224 and the first portion 302 of the camera module 220 towards the back side 214 of the chassis 204. Thus, the first portion 302 of the camera module 220 becomes angled with respect to the back side 214 of the chassis 204 (e.g., a plane of the portion of the camera module 220 is angled with respect to the back side 214 of the chassis 204). Additionally, the second portion 304 of the camera module 220 is substantially parallel (e.g., a plane of the camera module 220 is substantially parallel) with respect to the back side 214 of the chassis 204.

Furthermore, when the alignment post 224 is towards the back side 214 of the chassis 204, the alignment post 224 abuts the detent 502 that is proximate to the back side 214 of the chassis 204. The user of the computing environment 200 can adjust the angle of the first portion 302 of the camera module 220 by applying a force to the first portion 302 of the camera module 220—e.g., rotating the first portion 302 of the camera module 220 about the pivot point 306 towards the front side 216 of the chassis 204.

FIG. 7D illustrates further rotation of the first portion 302 with respect to the second portion 304 of the camera module 220 about the pivot point 306. Specifically, the alignment post 224 abuts the detent 502 that is proximate to the front side 216 of the chassis 204. Thus, the first portion 302 of the camera module 220 becomes angled with respect to the front side 216 of the chassis 204 (e.g., a plane of the portion of the camera module 220 is angled with respect to the front side 216 of the chassis 204. Additionally, the second portion 304 of the camera module 220 is substantially parallel (e.g., a plane of the camera module 220 is substantially parallel) with respect to the front side 216 of the chassis 204.

Furthermore, when the alignment post 224 is towards the front side 216 of the chassis 204, the alignment post 224 abuts the detent 502 that is proximate to the front side 216 of the chassis 204. The user of the computing environment 200 can adjust the angle of the first portion 302 of the camera module 220 by applying a force to the first portion 302 of the camera module 220—e.g., rotating the first portion 302 of the camera module 220 about the pivot point 306.

Figure 8B:
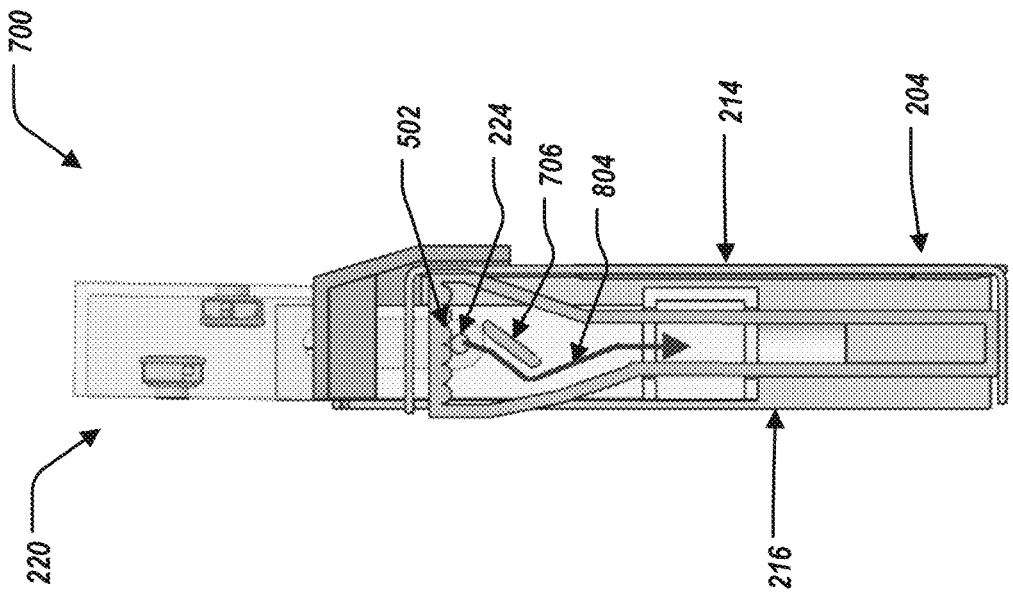
FIGS. 8A-8C illustrate translation of the fourth embodiment of the camera apparatus.
Figure 8A:
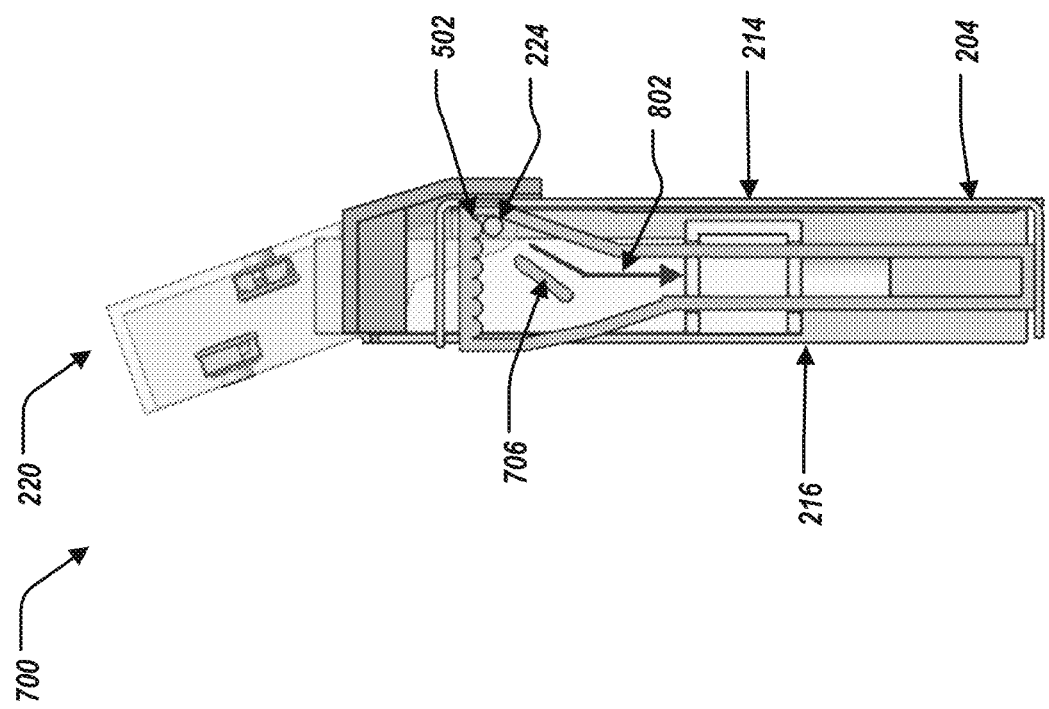
Figure 8C:
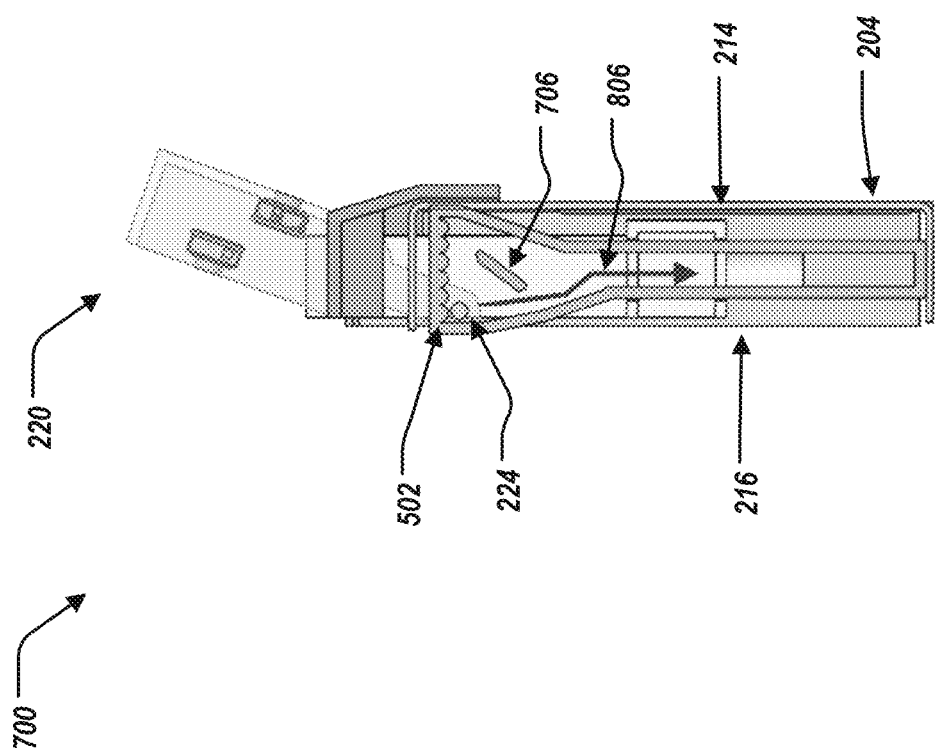

FIGS. 8A-8C illustrate the apparatus 700 displaying ingression of the camera module 220 within the chassis 204. Specifically, the partial partition 706 can facilitate translation of the camera module 220 from the second positional state to the first positional state. For example, as shown in FIG. 8A, when the alignment post 224 is towards the back side 214 of the chassis 204 (the alignment post 224 abuts the detent 502 that is proximate to the back side 214 of the chassis 204), the partial partition 706 facilitates translation of the alignment post 224 along a path 802 such that the camera module 220 is in the first positional state. When the alignment post 224 is in between the back side 214 and the front side 216 of the chassis 204, as shown in FIG. 8B, the partial partition 706 facilitates translation of the alignment post 224 along a path 804 such that the camera module 220 is in the first positional state. When the alignment post 224 is towards the front side 216 of the chassis 204 (the alignment post 224 abuts the detent 502 that is proximate to the front side 216 of the chassis 204), as shown in FIG. 8C, the partial partition 706 facilitates translation of the alignment post 224 along a path 806 such that the camera module 220 is in the first positional state. Furthermore, the guide rails 226 of the apparatus 700 can minimize and/or prevent racking of the camera module 220 as the camera module 220 translates along the paths 802, 804, 806.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus for an information handling system including:
   a chassis coupled to the information handling system and positioned within the information handling system, the chassis including:
   a top side and a bottom side, the bottom side positioned opposite the top side, the top side including an opening; and
   a camera module moveably coupled to the chassis, wherein the camera module is configured to linearly translate from the bottom side to the top side of the chassis and through the opening while concurrently automatically adjusting a camera viewing angle of the camera module,
   wherein the chassis further includes a back side positioned between top and the bottom side, wherein the camera module includes a camera and an alignment feature, the apparatus further comprising:
   a guide structure fixedly coupled to the chassis, the guide structure including a straight portion and an angled portion, wherein the alignment feature is positioned within a recess of the guide structure, wherein
   when the alignment feature of the camera module is positioned within the recess of the straight portion of the guide structure, the camera module is substantially parallel with respect to the back side of the chassis, and
   when the alignment feature of the camera module is positioned within the recess of the angled portion of the guide structure, at least a portion of the camera module i) is positioned through the opening of the top side of the chassis and ii) is angled with respect to the back side of the chassis.

2. The apparatus of claim 1, wherein the camera module includes a first portion and a second portion, wherein the first portion is configured to pivot about a connection point between the first portion and the second portion.

3. The apparatus of claim 2, further including:
   alignment pins fixedly coupled to the chassis and positioned between the top side and the bottom side of the chassis, and
   wherein the camera module further including openings such that the alignment pins are positioned through the openings of the camera module.

4. The apparatus of claim 2, wherein the camera module further includes openings such that the guide structure is positioned through the openings of the camera module to provide racking alignment of the camera module.

5. The apparatus of claim 2, wherein the angled portion of the guide structure includes detents, and wherein when the alignment feature of the camera module is positioned within the recess of the angled portion of the guide structure, the alignment feature abuts one or more of the detents to further define the angle of the camera module with respect to the back side of the chassis.

6. The apparatus of claim 1, further including:
a frictional hinge coupled to the chassis,
wherein when the alignment feature of the camera module is positioned within the recess of the angled portion of the guide structure, the frictional hinge is configured to define the angle of the camera module with respect to the back side of the chassis.

7. The apparatus of claim 1, wherein the camera module further includes an additional camera positioned opposite to the camera.

8. The apparatus of claim 1, wherein the angled portion of the guide structure is positioned proximate to the top side of the chassis and the straight portion of the guide structure is positioned proximate to the bottom side of the chassis.

9. The apparatus of claim 1, wherein the camera module is angled towards a front side of the chassis, the front side of the chassis opposite to the back side of the chassis and between the top side and the bottom side of the chassis.

10. The apparatus of claim 1, wherein the camera module is angled towards the back side of the chassis.

11. An information handling system, comprising:
a display unit;
a camera apparatus coupled to the display unit, the apparatus including:
a chassis coupled to the information handling system and positioned within the information handling system, the chassis including:
a top side and a bottom side, the bottom side positioned opposite the top side, the top side including an opening, and
a back side positioned between the top and the bottom side;
a camera module moveably coupled to the chassis, the camera module including a camera and an alignment feature;
a guide structure fixedly coupled to the chassis, the guide structure including a straight portion and an angled portion, wherein the alignment feature is positioned within a recess of the guide structure, wherein
when the alignment feature of the camera module is positioned within the recess of the straight portion of the guide structure, the camera module is substantially parallel with respect to the back side of the chassis, and
when the alignment feature of the camera module is positioned within the recess of the angled portion of the guide structure, at least a portion of the camera module i) is positioned through the opening of the top side of the chassis and ii) is angled with respect to the back side of the chassis.

12. The information handling system of claim 11, wherein the camera module includes a first portion and a second portion, wherein the first portion is configured to pivot about a connection point between the first portion and the second portion.

13. The information handling system of claim 11, further including:
alignment pins fixedly coupled to the chassis and positioned between the top side and the bottom side of the chassis, and
wherein the camera module further including openings such that the alignment pins are positioned through the openings of the camera module.

14. The information handling system of claim 11, wherein the camera module further includes openings such that the guide structure is positioned through the openings of the camera module to provide racking alignment of the camera module.

15. The information handling system of claim 11, wherein the angled portion of the guide structure includes detents, and wherein when the alignment feature of the camera module is positioned within the recess of the angled portion of the guide structure, the alignment feature abuts one or more of the detents to further define the angle of the camera module with respect to the back side of the chassis.

16. The information handling system of claim 11, further including:
a frictional hinge coupled to the chassis,
wherein when the alignment feature of the camera module is positioned within the recess of the angled portion of the guide structure, the frictional hinge is configured to define the angle of the camera module with respect to the back side of the chassis.

17. The information handling system of claim 11, wherein the camera module further includes an additional camera positioned opposite to the camera.

18. The information handling system of claim 11, wherein the angled portion of the guide structure is positioned proximate to the top side of the chassis and the straight portion of the guide structure is positioned proximate to the bottom side of the chassis.

19. An apparatus for an information handling system including:
a chassis coupled to the information handling system and positioned within the information handling system, the chassis including:
a top side and a bottom side, the bottom side positioned opposite the top side, the top side including an opening, and
a back side positioned between the top and the bottom side;
a camera module moveably coupled to the chassis, the camera module including a top portion configured to pivot about a connection point between the top portion and the bottom portion, the camera module including:
a camera, and
an alignment feature;
a guide structure fixedly coupled to the chassis, the guide structure including a straight portion and an angled portion, wherein the alignment feature is positioned within a recess of the guide structure, wherein
when the alignment feature of the camera module is positioned within the recess of the straight portion of the guide structure, the camera module is substantially parallel with respect to the back side of the chassis, and
when the alignment feature of the camera module is positioned within the recess of the angled portion of the guide structure, at least a portion of the camera module i) is positioned through the opening of the top side of the chassis and ii) is angled with respect to the back side of the chassis, wherein the camera module further includes openings such that the guide structures are positioned through the openings of the camera module.

* * * * *